United States Patent
Miller et al.

(10) Patent No.: US 12,443,763 B2
(45) Date of Patent: *Oct. 14, 2025

(54) ENCRYPTING DATA USING NON-REPEATING IDENTIFIERS

(71) Applicant: PURE STORAGE, INC., Santa Clara, CA (US)

(72) Inventors: Ethan L. Miller, Santa Cruz, CA (US); John Colgrove, Los Altos, CA (US); Mark L. McAuliffe, San Francisco, CA (US); Naveen Neelakantam, Mountain View, CA (US); Marco Sanvido, Belmont, CA (US); Neil A. Vachharajani, Menlo Park, CA (US); Taher Vohra, Sunnyvale, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,605

(22) Filed: Nov. 30, 2023

(65) Prior Publication Data
US 2024/0193311 A1    Jun. 13, 2024

Related U.S. Application Data

(63) Continuation of application No. 16/815,529, filed on Mar. 11, 2020, now Pat. No. 11,841,984, which is a
(Continued)

(51) Int. Cl.
*G06F 21/00* (2013.01)
*G06F 21/62* (2013.01)
(Continued)

(52) U.S. Cl.
CPC .......... *G06F 21/78* (2013.01); *G06F 21/6227* (2013.01); *H04L 9/065* (2013.01); *H04L 9/0866* (2013.01); *H04L 9/0894* (2013.01)

(58) Field of Classification Search
CPC ..... G06F 21/78; G06F 21/6227; H04L 9/065; H04L 9/0866; H04L 9/0894
See application file for complete search history.

(56) References Cited

U.S. PATENT DOCUMENTS 5,706,210 A    1/1998   Kumano et al.
5,799,200 A    8/1998   Brant et al.
(Continued)

FOREIGN PATENT DOCUMENTS

EP          0725324 A2    8/1996
WO    WO-2012087648 A2    6/2012
(Continued)

OTHER PUBLICATIONS

Bellamy-McIntyre J., et al., "OpenID and the Enterprise: A Model-based Analysis of Single Sign-On Authentication," (online), 2011, 15th IEEE International Enterprise Distributed Object Computing Conference (EDOC), Dated Aug. 29, 2011, 10 pages, DOI: 10.1109/EDOC.2011.26, ISBN: 978-1-4577-0362-1, Retrieved from URL: https://www.cs.auckland.ac.nz/lutteroth/publications/McintyreLutterothWeber2011-OpenID.pdf.
(Continued)

*Primary Examiner* — Mahfuzur Rahman

(57) ABSTRACT

Utilizing a non-repeating identifier to encrypt data, including: receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair.

17 Claims, 6 Drawing Sheets

Related U.S. Application Data continuation of application No. 16/040,575, filed on Jul. 20, 2018, now Pat. No. 10,607,034, which is a continuation of application No. 15/669,279, filed on Aug. 4, 2017, now Pat. No. 10,037,440, which is a continuation of application No. 14/730,202, filed on Jun. 3, 2015, now Pat. No. 9,779,268.

(60) Provisional application No. 62/007,200, filed on Jun. 3, 2014.

(51) Int. Cl.
    *G06F 21/78*     (2013.01)
    *H04L 9/06*     (2006.01)
    *H04L 9/08*     (2006.01)

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,606,364 B1 * | 10/2009 | Shih ............... H04L 9/0894 380/42 |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 7,975,115 B2 | 7/2011 | Wayda et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,300,823 B2 * | 10/2012 | Bojinov ............... H04L 9/065 380/269 |
| 8,387,136 B2 | 2/2013 | Lee et al. |
| 8,437,189 B1 | 5/2013 | Montierth et al. |
| 8,465,332 B2 | 6/2013 | Hogan et al. |
| 8,504,797 B2 | 8/2013 | Mimatsu |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,822,155 B2 | 9/2014 | Sukumar et al. |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,280,678 B2 | 3/2016 | Redberg |
| 9,300,660 B1 | 3/2016 | Borowiec et al. |
| 9,395,922 B2 | 7/2016 | Nishikido et al. |
| 9,444,822 B1 | 9/2016 | Borowiec et al. |
| 9,507,532 B1 | 11/2016 | Colgrove et al. |
| 9,779,268 B1 * | 10/2017 | Colgrove ............ G06F 21/6227 |
| 10,037,440 B1 * | 7/2018 | Colgrove ............ H04L 9/065 |
| 10,324,639 B2 | 6/2019 | Seo |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0013802 A1 | 1/2002 | Mori et al. |
| 2002/0095487 A1 * | 7/2002 | Day .................. H04L 61/00 709/223 |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0097760 A1 * | 5/2007 | Trinh .................. G11C 15/00 365/200 |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0220277 A1 * | 9/2007 | Osaki .................. G06F 21/6245 713/193 |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0256141 A1 | 10/2008 | Wayda et al. |
| 2008/0270678 A1 | 10/2008 | Cornwell et al. |
| 2008/0282045 A1 | 11/2008 | Biswas et al. |
| 2009/0063756 A1 * | 3/2009 | Asipov .................. G06F 21/12 711/E12.008 |
| 2009/0077340 A1 | 3/2009 | Johnson et al. |
| 2009/0100115 A1 | 4/2009 | Park et al. |
| 2009/0198889 A1 | 8/2009 | Ito et al. |
| 2009/0323667 A1 * | 12/2009 | Doi .................. H04W 8/26 370/349 |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0306500 A1 | 12/2010 | Mimatsu |
| 2010/0325345 A1 | 12/2010 | Ohno et al. |
| 2010/0332754 A1 | 12/2010 | Lai et al. |
| 2011/0035540 A1 | 2/2011 | Fitzgerald et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0154059 A1 * | 6/2011 | Durham ............... G06F 21/79 711/163 |
| 2011/0187817 A1 * | 8/2011 | Sasaki .................. H04N 5/445 348/E13.001 |
| 2011/0305443 A1 * | 12/2011 | Sasaki .................. H04N 13/183 386/E5.028 |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0144195 A1 * | 6/2012 | Nair .................. H04N 7/1675 713/168 |
| 2012/0201361 A1 * | 8/2012 | Angel ............... H04M 3/42221 379/88.01 |

(56) References Cited

U.S. PATENT DOCUMENTS

| | | | |
|---|---|---|---|
| 2012/0202465 A1* | 8/2012 | Angel | H04M 3/42221 |
| | | | 455/412.1 |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0220561 A1 | 8/2014 | Sukumar et al. | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0365281 A1* | 12/2014 | Onischuk | G07C 13/00 |
| | | | 705/12 |
| 2014/0373104 A1 | 12/2014 | Gaddam et al. | |
| 2014/0373126 A1 | 12/2014 | Hussain et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0154418 A1 | 6/2015 | Redberg | |
| 2015/0193169 A1 | 7/2015 | Sundaram et al. | |
| 2015/0207787 A1* | 7/2015 | Cannell | H04L 63/08 |
| | | | 726/4 |
| 2015/0378888 A1 | 12/2015 | Zhang et al. | |
| 2016/0026397 A1 | 1/2016 | Nishikido et al. | |
| 2016/0098323 A1 | 4/2016 | Mutha et al. | |
| 2016/0182542 A1 | 6/2016 | Staniford | |
| 2016/0248631 A1 | 8/2016 | Duchesneau | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2017/0262202 A1 | 9/2017 | Seo | |
| 2018/0054454 A1 | 2/2018 | Astigarraga et al. | |
| 2018/0081562 A1 | 3/2018 | Vasudevan | |
| 2019/0205244 A1* | 7/2019 | Smith | G06F 3/065 |
| 2019/0220315 A1 | 7/2019 | Vallala et al. | |
| 2020/0034560 A1 | 1/2020 | Natanzon et al. | |
| 2020/0326871 A1 | 10/2020 | Wu et al. | |
| 2021/0360833 A1 | 11/2021 | Alissa et al. | |

FOREIGN PATENT DOCUMENTS

| | | |
|---|---|---|
| WO | WO-2013071087 A1 | 5/2013 |
| WO | WO-2014110137 A1 | 7/2014 |
| WO | WO-2016015008 A1 | 1/2016 |
| WO | WO-2016190938 A1 | 12/2016 |
| WO | WO-2016195759 A1 | 12/2016 |
| WO | WO-2016195958 A1 | 12/2016 |
| WO | WO-2016195961 A1 | 12/2016 |

OTHER PUBLICATIONS

ETSI: "Network Function Virtualisation (NFV); Resiliency Requirements," ETSI GS NFV-REL 001, V1.1.1, etsi.org (Online), Jan. 2015, 82 Pages, Retrieved from URL: www.etsi.org/deliver/etsi_gs/NFV-RELJ001_099/001/01.01.01_60/gs_NFV-REL001v010101p.pdf.

Faith R., "Dictzip File Format," GitHub.com (Online), 01 Page, [Accessed on Jul. 28, 2015] Retrieved from URL: github.com/fidlej/idzip.

Google Search Of: "Storage Array Define," U.S. Appl. No. 14/725,278 filed Nov. 4, 2015, Results Limited to Entries Dated before 2012, 01 Page.

Hota C., et al., "Capability-Based Cryptographic Data Access Control in Cloud Computing," International Journal of Advanced Networking and Applications, Eswar Publications, India, Aug. 13, 2011, vol. 1, No. 1, 10 Pages.

Hu X-Y., et al., "Container Marking: Combining Data Placement, Garbage Collection and Wear Levelling for Flash," 19th Annual IEEE International Symposium on Modeling, Analysis, and Simulation of Computer and Telecommunications Systems, Jul. 25-27, 2011, 11 Pages, DOI: 10.1109/MASCOTS.2011.50, ISBN: 978-0-7695-4430-4.

Hwang K., et al., "RAID-x: A New Distributed Disk Array for I/O-Centric Cluster Computing," Proceedings of The Ninth International Symposium on High-performance Distributed Computing, IEEE Computer Society, Los Alamitos, CA, Aug. 2000, pp. 279-286.

International Search Report and Written Opinion for International Application No. PCT/US2016/015006, Apr. 29, 2016, 12 pages.

International Search Report and Written Opinion for International Application No. PCT/US2016/016333, Jun. 8, 2016, 12 pages.

International Search Report and Written Opinion for International Application No. PCT/US2016/020410, mailed Jul. 8, 2016, 17 pages.

International Search Report and Written Opinion for International Application No. PCT/US2016/032052, mailed Aug. 30, 2016, 17 Pages.

International Search Report and Written Opinion for International Application No. PCT/US2016/032084, mailed Jul. 18, 2016, 12 Pages.

International Search Report and Written Opinion for International Application No. PCT/US2016/035492, mailed Aug. 17, 2016, 10 pages.

International Search Report and Written Opinion for International Application No. PCT/US2016/036693, mailed Aug. 29, 2016, 10 Pages.

International Search Report and Written Opinion for International Application No. PCT/US2016/038758, mailed Oct. 7, 2016, 10 Pages.

International Search Report and Written Opinion for International Application No. PCT/US2016/040393, mailed Sep. 22, 2016, 10 Pages.

International Search Report and Written Opinion for International Application No. PCT/US2016/044020, mailed Sep. 30, 2016, 11 Pages.

International Search Report and Written Opinion for International Application No. PCT/US2016/044874, mailed Oct. 7, 2016, 11 Pages.

International Search Report and Written Opinion for International Application No. PCT/US2016/044875, mailed Oct. 5, 2016, 13 pages.

(56) References Cited

OTHER PUBLICATIONS

International Search Report and Written Opinion for International Application No. PCT/US2016/044876, mailed Oct. 21, 2016, 12 Pages.

International Search Report and Written Opinion for International Application No. PCT/US2016/044877, mailed Sep. 29, 2016, 13 pages.

International Search Report and Written Opinion of the International Application No. PCT/US2016/015008, mailed May 4, 2016, 12 pages.

Kong K., "Using PCI Express as the Primary System Interconnect in Multiroot Compute, Storage, Communications and Embedded Systems," IDT, White Paper, Aug. 28, 2008, 12 Pages, [Retrieved by WIPO on Dec. 1, 2014] Retrieved from URL: http://www.idt.com/document/whp/idt-pcie-multi-root-white-paper.

Li J., et al., "Access Control for the Services Oriented Architecture," Proceedings of the ACM Workshop on Secure Web Services (SWS), ACM, New York, Nov. 2, 2007, pp. 9-17.

Microsoft: "Hybrid for SharePoint Server 2013—Security Reference Architecture," Oct. 1, 2014, pp. 1-53, XP055296534, [Retrieved on Aug. 19, 2016] Retrieved from URL: http://hybrid.office.com/img/Security_Reference_Architecture.pdf.

Microsoft, "Hybrid Identity Management", Microsoft (online), Apr. 2014, 2 pages, URL: download.microsoft.com/ download/E/A/E/EAE57CD1-A80B-423C-96BB-142FAAC630B9/Hybrid_Identity_Datasheet.pdf.

Microsoft, "Hybrid Identity," (online), Dated Apr. 2014, 36 pages, Retrieved from URL: http://aka.ms/HybridIdentityWp.

PCMAG: "Storage Array Definition," Published May 10, 2013, 1 page, Retrieved from URL: http://web.archive.Org/web/20130510121646/http://www.pcmag.com/encyclopedia/term/52091/storage-array.

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Secure Data Deduplication," Proceedings of the 4th ACM International Workshop on Storage Security and Survivability (StorageSS'08), ACM New York, NY, USA, Oct. 31, 2008, 10 Pages, DOI: 10.1145/1456471.

Storer M.W., et al., "Pergamum: Replacing Tape with Energy Efficient, Reliable, Disk-Based Archival Storage," 6th Usenix Conference on File and Storage Technologies (FAST'08), San Jose, CA, USA, Feb. 26-29, 2008, 16 Pages, ISBN 978-1-931971-56-0, XP002665467.

Sweere P., "Creating Storage Class Persistent Memory with NVDIMM," Flash Memory Summit, Aug. 2013, 22 Pages, Retrieved from URL: http://www.flashmemorysummit.com/English/Collaterals/Proceedings/2013/20130814_T2_Sweere.pdf.

Techopedia, "What is a Disk Array," techopedia.com (online), Jan. 13, 2012, 1 Page, Retrieved from URL: https://web.archive.org/web/20120113053358/http://www.techopedia.com/definition/1009/disk-array.

Webopedia, "What is a disk array," webopedia.com (online), May 26, 2011, 2 Pages, Retrieved from URL: https://web/archive.org/web/20110526081214/http://www.webopedia.com/TERM/D/disk_array.html.

Wikipedia, "Convergent Encryption," Wikipedia.org (online), Accessed on Sep. 8, 2015, 2 pages, Retrieved from URL: en.wikipedia.org/wiki/Convergent_encryption.

* cited by examiner

… (1)

ENCRYPTING DATA USING NON-REPEATING IDENTIFIERS

CROSS-REFERENCE TO RELATED APPLICATIONS

This is a continuation application for patent entitled to a filing date and claiming the benefit of earlier-filed U.S. Pat. No. 11,841,984, issued Dec. 12, 2023, which is a continuation of U.S. Pat. No. 10,607,034, issued Mar. 31, 2020, which is a continuation of U.S. Pat. No. 10,037,440, issued Jul. 31, 2018, which is a continuation of U.S. Pat. No. 9,779,268, issued Oct. 3, 2017, which claims priority from U.S. Provisional Patent Application No. 62/007,200, filed Jun. 3, 2014, each of which are hereby incorporated by reference in their entirety.

DETAILED DESCRIPTION OF EXAMPLE EMBODIMENTS

Figure 1:
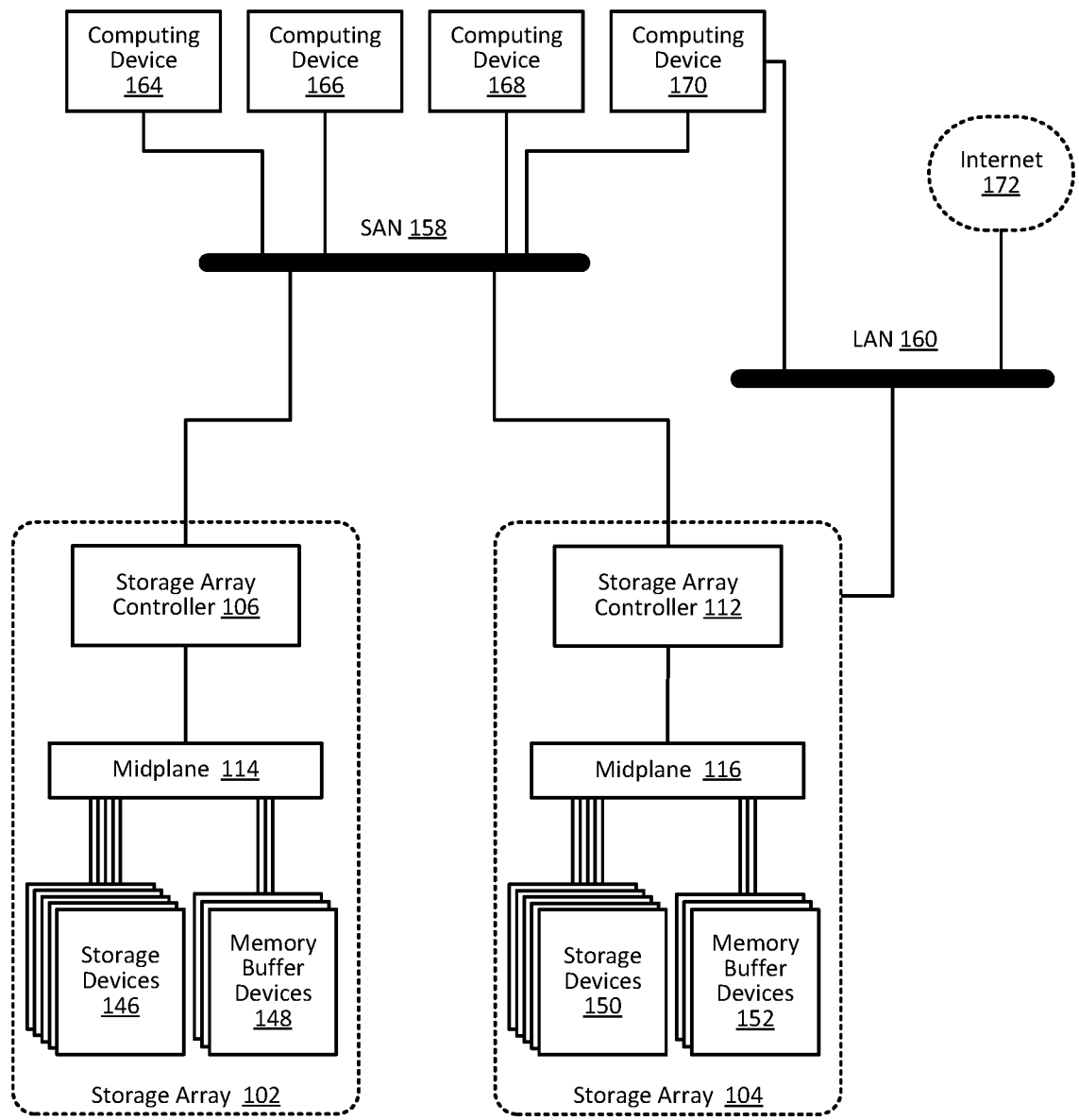
FIG. 1 sets forth a block diagram of an example system configured for utilizing a non-repeating identifier to encrypt data according to embodiments of the present invention.

Example methods, apparatuses, and products for utilizing a non-repeating identifier to encrypt data in accordance with the present invention are described with reference to the accompanying drawings, beginning with FIG. 1. FIG. 1 sets forth a block diagram of a system configured for utilizing a non-repeating identifier to encrypt data according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be configured for utilizing a non-repeating identifier to encrypt data according to embodiments of the present invention. The storage array controllers (106, 112) may utilize a non-repeating identifier to encrypt data by receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair, as will be described in greater detail below.

In an alternative embodiment, the storage devices (146, 150) themselves may be configured for utilizing a non-repeating identifier to encrypt data according to embodiments of the present invention. The storage devices (146, 150) may utilize a non-repeating identifier to encrypt data by receiving a request to write data to a storage device; selecting a segment-offset pair where the data will be stored, where the selected segment-offset pair is unique to every other segment-offset pair utilized during the lifetime of the storage device; and encrypting the data in dependence upon an identifier of the segment-offset pair, as will be described in greater detail below.

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Utilizing a non-repeating identifier to encrypt data in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for utilizing a non-repeating identifier to encrypt data according to embodiments of the present invention.

Figure 2:
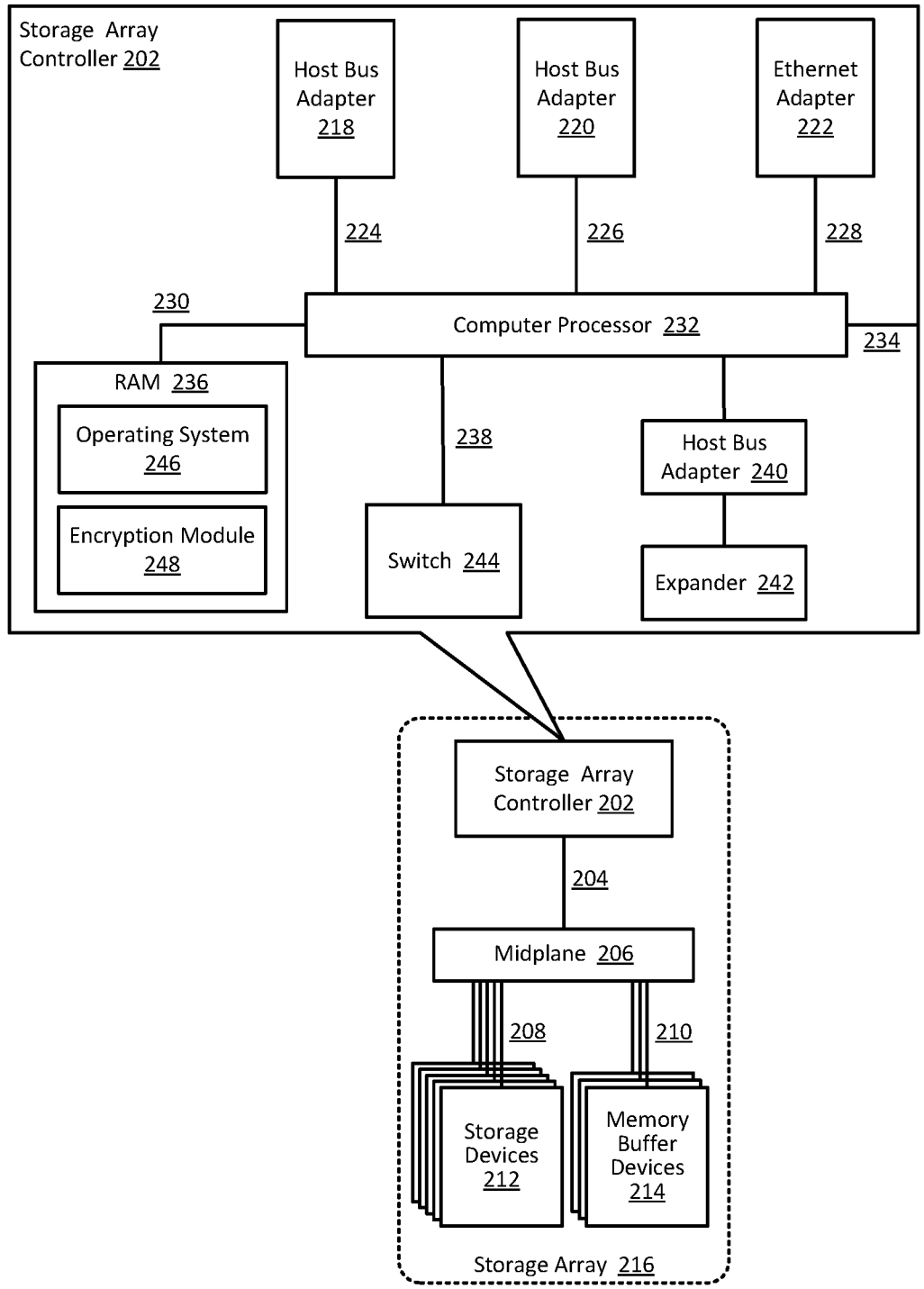
FIG. 2 sets forth a block diagram of an example storage array controller useful in utilizing a non-repeating identifier to encrypt data according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for utilizing a non-repeating identifier to encrypt data according to embodiments of the present invention include UNIX™, Linux™, Microsoft Windows™, and others as will occur to those of skill in the art. Also stored in RAM (236) is an encryption module (248), a module that includes computer program instructions for utilizing a non-repeating identifier to encrypt data according to embodiments of the present invention. The functionality of the encryption module (248) will be described in greater detail below, but readers will appreciate that while the encryption module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
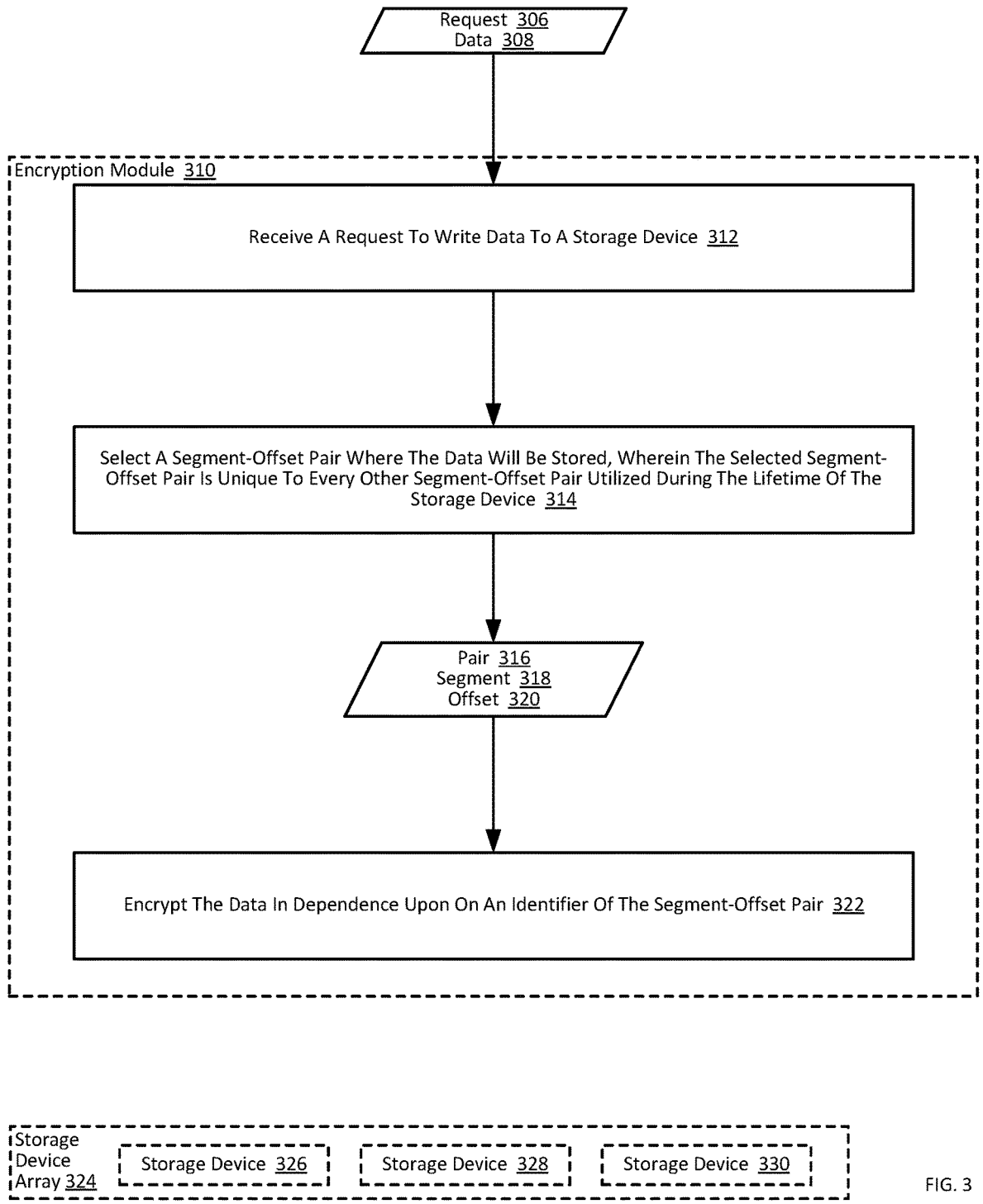
FIG. 3 sets forth a flow chart illustrating an example method for utilizing a non-repeating identifier to encrypt data according to embodiments of the present invention.

For further explanation, FIG. 3 sets forth a flow chart illustrating an example method for utilizing a non-repeating identifier to encrypt data according to embodiments of the present invention. The example method depicted in FIG. 3 may be carried out, at least in part, by an encryption module (310). The encryption module (310) of FIG. 3 may be embodied as a module of computer program instructions executing on computer hardware such as a computer processor. The encryption module (310) of FIG. 3 may be executing on a storage array controller such as the storage array controllers described above with reference to FIG. 1 and FIG. 2. The encryption module (310) of FIG. 3 may alternatively be executing on a storage device such as the storage devices described above with reference to FIG. 1 and FIG. 2. In another alternative embodiment, a first encryption module may be executing on a storage array controller while a second encryption module may be executing on a storage device, where each encryption module is configured to cooperatively perform the functions described herein.

The example method depicted in FIG. 3 includes receiving (312) a request (306) to write data (308) to a storage device (326, 328, 330). The request (306) of FIG. 3 may be embodied, for example, as one or more messages received by a storage array controller that is executing the encryption module (310). The one or more messages may include, for example, a first message to initiate the write process and one or more subsequent messages that include the data (308), all of which may be received by the storage array controller over a data communications network such as a SAN, a LAN, or any other data communications link. The request (306) of FIG. 3 may include, for example, an identification of a device that issued the request (306), an identification of a user that issued the request (306), the data (308) that is to be written to the one or more of the storage devices (326, 328, 330), a reference to the data (308) that is to be written to the one or more of the storage devices (326, 328, 330), and any other information needed to service the request (306).

The example method depicted in FIG. 3 also includes selecting (314) a segment-offset pair (316) where the data (308) will be stored. The segment-offset pair (316) of FIG. 3 includes a segment identifier (318) and an offset value (320). The segment identifier (318) and the offset value (320) represent a location in memory within the storage device (326, 328, 330) where the data (308) will be stored. The segment identifier (318) and the offset value (320) are logical constructs that map to physical locations within the storage device (326, 328, 330).

Consider an example in which a particular storage device (326) included 4 gigabytes ('GBs') of storage. In such an example, the storage could be logically broken up, for example, into four segments of 1 GB each. In such an example, the first GB of storage could be associated with a segment identifier of "1," the second GB of storage could be associated with a segment identifier of "2," the third GB of storage could be associated with a segment identifier of "3," and the fourth GB of storage could be associated with a segment identifier of "4." In such an example, the offset value represents the displacement from the beginning of the segment identified in a segment-offset pair.

In the example method depicted in FIG. 3, the selected segment-offset pair (316) is unique relative to every other segment-offset pair previously utilized by the storage device and the selected segment-offset pair (316) also cannot be reutilized to service another subsequently received request to write data to the storage device (326, 328, 330). In such a way, the selected segment-offset pair (316) is unique relative to every other segment-offset pair utilized during the lifetime of the storage device (326, 328, 330). Because the selected segment-offset pair (316) is unique relative to every other segment-offset pair utilized during the lifetime of the storage device (326, 328, 330), no other data will ever be written to the selected segment-offset pair (316) during the lifetime of the storage device (326, 328, 330).

The selected segment-offset pair (316) can be unique relative to every other segment-offset pair utilized during the lifetime of the storage device (326, 328, 330) because data may be written to the storage devices (326, 328, 330) in only one of two ways: 1) data may be written to free space in an existing segment, or 2) a new segment may be created and data may be written to the new segment. In the situation where data is written to free space in an existing segment, because the space is free, no other data has been written to that particular segment-offset location. In the situation where a new segment is created and data is written to the new segment, because segment identifiers are not reused, no other data has been written to that particular segment-offset location.

Readers will appreciate that as data in a particular segment becomes invalid (e.g., an updated version of the data has been written to another location), the invalid data may be erased and the underlying physical storage resources may be allocated to a new segment. In such an example, the valid data in the particular segment may be copied and written to another segment as described above: 1) by writing the valid data to free space in an existing segment, or 2) by creating a new segment and writing the valid data to the new segment.

Readers will further appreciate that while a particular segment-identifier pair maps to a single physical location within the storage device (326, 328, 330), multiple segment-identifier pairs may map to the same physical location within the storage device (326, 328, 330). As such, the same physical location within the storage device (326, 328, 330) may be referenced using multiple segment-identifier pairs during the lifetime of the storage device (326, 328, 330). Because each segment-offset pair (316) is unique relative to every other segment-offset pair utilized during the lifetime of the storage device (326, 328, 330), however, each segment-offset pair (316) contains unique values (e.g., a combination of a segment identifier and offset value) that will never been associated with any other data stored in the storage device (326, 328, 330) during the lifetime of the storage device (326, 328, 330).

The example method depicted in FIG. 3 also includes encrypting (322) the data (308) in dependence upon an identifier of the segment-offset pair (316). Encrypting (322) the data (308) in dependence upon an identifier of the segment-offset pair (316) may be carried out using an encryption algorithm that utilizes an initialization vector ('IV') as an input to the algorithm. In such an example, the IV may include values from the segment-offset pair (316), such as the segment identifier (318) and an offset value (320). Because each segment-offset pair (316) is unique relative to every other segment-offset pair utilized during the lifetime of the storage device (326, 328, 330), the IV used to encrypt (322) the data (308) will also be unique relative to every other IV utilized during the lifetime of the storage device (326, 328, 330).

Figure 4:
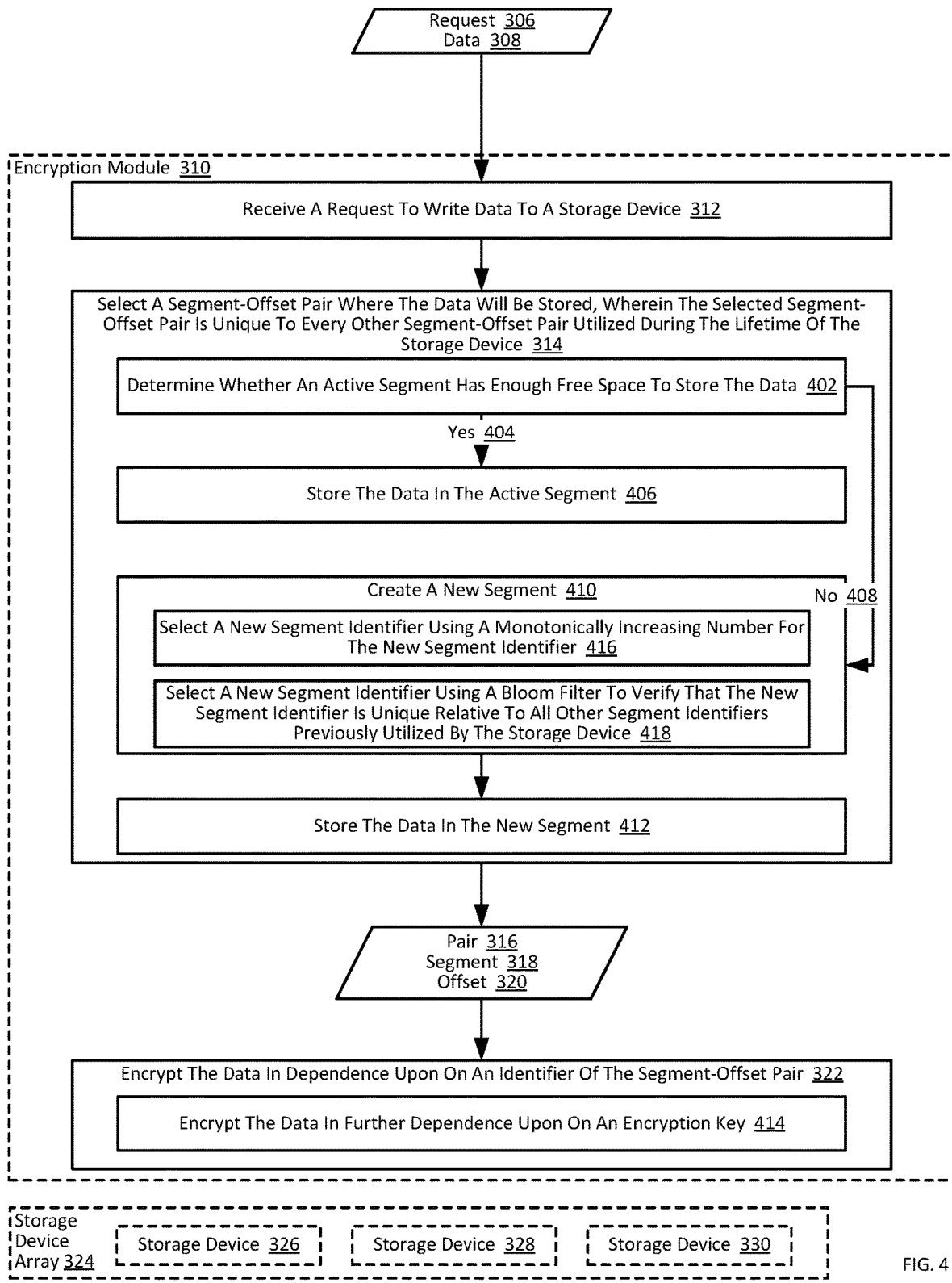
FIG. 4 sets forth a flow chart illustrating an additional example method for utilizing a non-repeating identifier to encrypt data according to embodiments of the present invention.

For further explanation, FIG. 4 sets forth a flow chart illustrating an additional example method for utilizing a non-repeating identifier to encrypt data according to embodiments of the present invention. The example method depicted in FIG. 4 is similar to the example method depicted in FIG. 3, as the example method depicted in FIG. 4 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 4, selecting (314) a segment-offset pair (316) where the data (308) will be stored can include determining (402) whether an active segment has enough free space to store the data (308). An active segment is a segment whose allocation units have not been allocated to another segment. Determining (402) whether the active segment has enough free space to store the data (308) may be carried out, for example, by determining the size of the data (308), determining the amount of free space available in the active segment, and determining that the amount of free space available in the active segment is greater than the size of the data (308).

In the example method depicted in FIG. 4, selecting (314) a segment-offset pair (316) where the data (308) will be stored can also include, responsive to affirmatively (404) determining that the active segment does have enough free space to store the data (308), storing (406) the data (308) in the active segment. Storing (406) the data (308) in the active segment may be carried out, for example, by storing the data (308) at free locations within the active segment. Such locations may be characterized by an offset within the active segment, and as such, selecting (314) a segment-offset pair (316) where the data (308) will be stored may be carried out by determining the offset within the active segment that corresponds to the free locations within the active segment where the data (308) will be stored (406).

In the example method depicted in FIG. 4, selecting (314) a segment-offset pair (316) where the data (308) will be stored can also include, responsive to determining that the active segment does not (408) have enough free space to store the data (308), creating (410) a new segment. In the example method depicted in FIG. 4, creating (410) a new segment may include selecting a new segment identifier for the new segment. As described above, the new segment identifier must be unique relative to any other segment identifier utilized during the lifetime of the storage device (326, 328, 330). That is, the new segment identifier must not only be unique relative to any other segment identifier ever used by the storage device (326, 328, 330), but the new segment identifier must never be reused by another segment.

In the example method depicted in FIG. 4, creating (410) a new segment can include selecting (416) a new segment identifier using a monotonically increasing number for the new segment identifier. Selecting (416) the new segment identifier using a monotonically increasing number for the new segment identifier may be carried out, for example, by retrieving all other segment numbers currently utilized by the storage device (326, 328, 330) and selecting a number that is larger than all other segment numbers currently utilized by the storage device (326, 328, 330).

In the example method depicted in FIG. 4, creating (410) a new segment can alternatively include selecting (418) a new segment identifier using a Bloom filter to verify that the new segment identifier is unique relative to all other segment identifiers previously utilized by the storage device. A Bloom filter is a probabilistic data structure that is utilized to test whether an element is a member of a set. False positive matches are possible utilizing a Bloom filter but false negatives are not, meaning that an element can definitively be determined to not be a member of the set. In such an example, a set may be created that includes each segment identifier previously utilized by the storage device and the Bloom filter may be used to determine whether the new segment identifier is definitively not part of the set. As such, candidate new segment identifiers may be selected randomly but only those randomly selected new segment identifiers that are definitively determined to not be part of the set may be selected (418) as the segment identifier for the newly created segment.

Readers will appreciate that in still further embodiments, other methodologies may be utilized to ensure that the segment identifiers for newly created segments are unique relative to any other segment identifier that will be used during the lifetime of the storage device (326, 328, 330). For example, each process that may create a segment may be given non-overlapping ranges of segment identifiers that each process may use when creating a new segment. For example, a first process may be given a range of 0 to 1000 as the available segment identifiers that the first process may utilize when creating a new segment, while a second process may be given a range of 1001 to 2000 as the available segment identifiers that the second process may utilize when creating a new segment. In such an example, when a particular process runs out of available identifiers, a new non-overlapping range of segment identifiers may be provided to the process.

In the example method depicted in FIG. 4, selecting (314) a segment-offset pair (316) where the data (308) will be stored can also include, responsive to determining that the active segment does not (408) have enough free space to store the data (308), storing (412) the data (308) in the new segment. Storing (412) the data (308) in the new segment may be carried out, for example, by storing the data (308) at a storage location in the storage device (326, 328, 330) that corresponds to the new segment.

In the example method depicted in FIG. 4, encrypting (322) the data (308) in dependence upon an identifier of the segment-offset pair (316) can include encrypting (414) the data (308) in further dependence upon an encryption key. Such an encryption key may be fixed for a particular system and may be randomly generated when the system is initially set up. Encrypting (414) the data (308) in further dependence upon an encryption key may therefore be carried out utilizing an encryption algorithm that produces different encryptions based on a fixed k-bit key (k=128 or k=256, for example) and a variable m-bit IV (m=128 for example, but might be different sizes for different algorithms) generated in dependence upon an identifier of the segment-offset pair (316).

Figure 5:
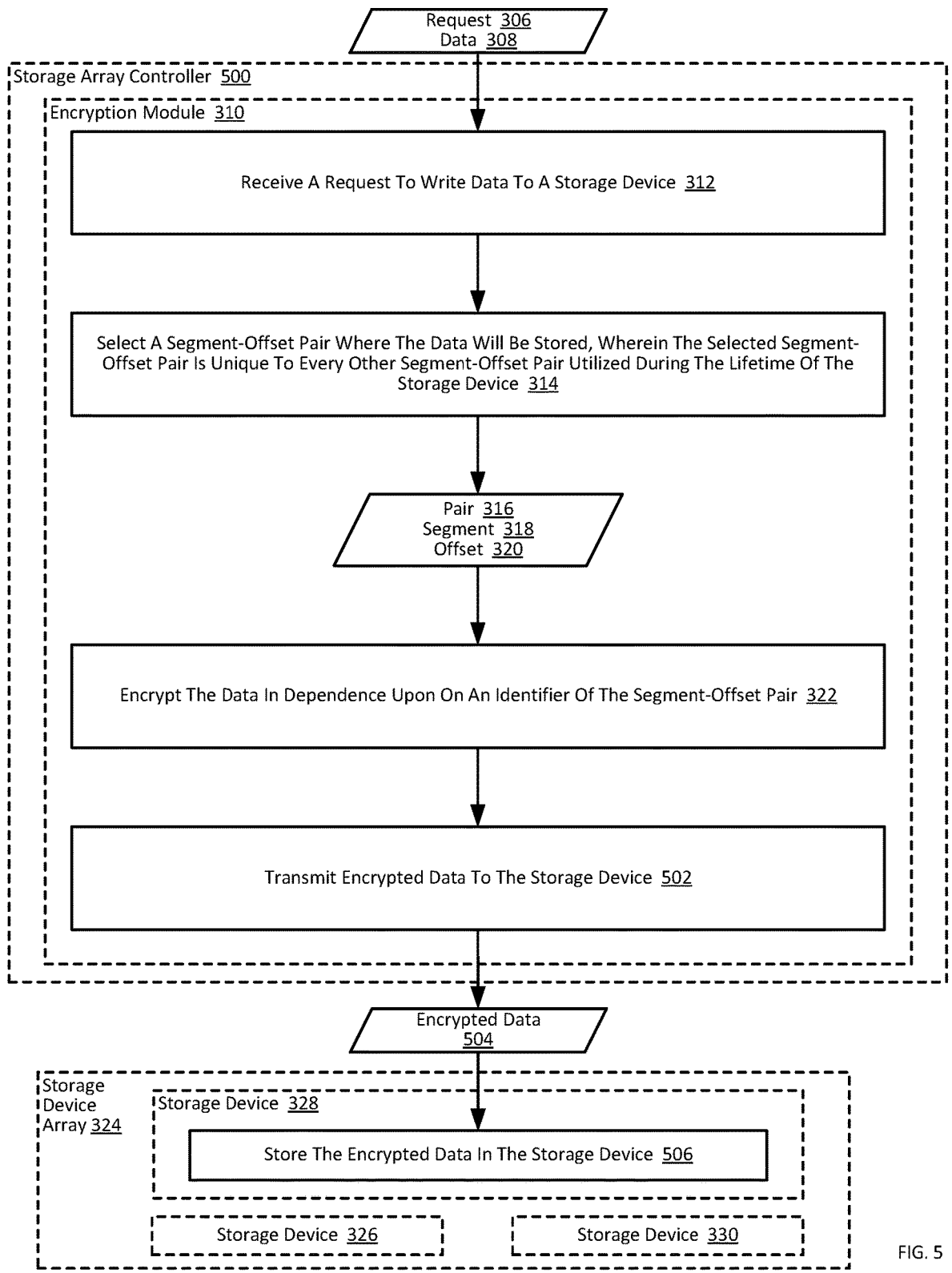
FIG. 5 sets forth a flow chart illustrating an additional example method for utilizing a non-repeating identifier to encrypt data according to embodiments of the present invention.

For further explanation, FIG. 5 sets forth a flow chart illustrating an additional example method for utilizing a non-repeating identifier to encrypt data according to embodiments of the present invention. The example method depicted in FIG. 5 is similar to the example method depicted in FIG. 3, as the example method depicted in FIG. 5 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 5, encrypting (322) the data (308) in dependence upon an identifier of the segment-offset pair (316) is carried out by an encryption module (310) that is executing on a storage array controller (500). The storage array controller (500) of FIG. 5 may be similar to the storage array controllers described above with reference to FIG. 1 and FIG. 2.

The example method depicted in FIG. 5 also includes transmitting (502) encrypted data (504) to the storage device (328). The encrypted data (504) may be transmitted (502) from the storage array controller (500) to a particular storage device (328) via a data communications link between the storage array controller (500) and the particular storage device (328). Such a data communications link may be embodied, for example, as a plurality of PCIe links that couple the storage array controller (500) and the particular storage device (328) to different sides of a midplane, as described above with reference to FIG. 1. The encrypted data (504) may be transmitted (502) from the storage array controller (500) to a particular storage device (328) via one or more messages that may include other information useful in writing the encrypted data (504) to the particular storage device (328) such as, for example, the segment-offset pair (316).

The example method depicted in FIG. 5 also includes storing (506) the encrypted data (504) in the storage device (328). In the example method depicted in FIG. 5, the encrypted data (504) may be stored (506) at a location in the storage device (328) that corresponds to the segment-offset pair (316) selected (314) above.

Figure 6:
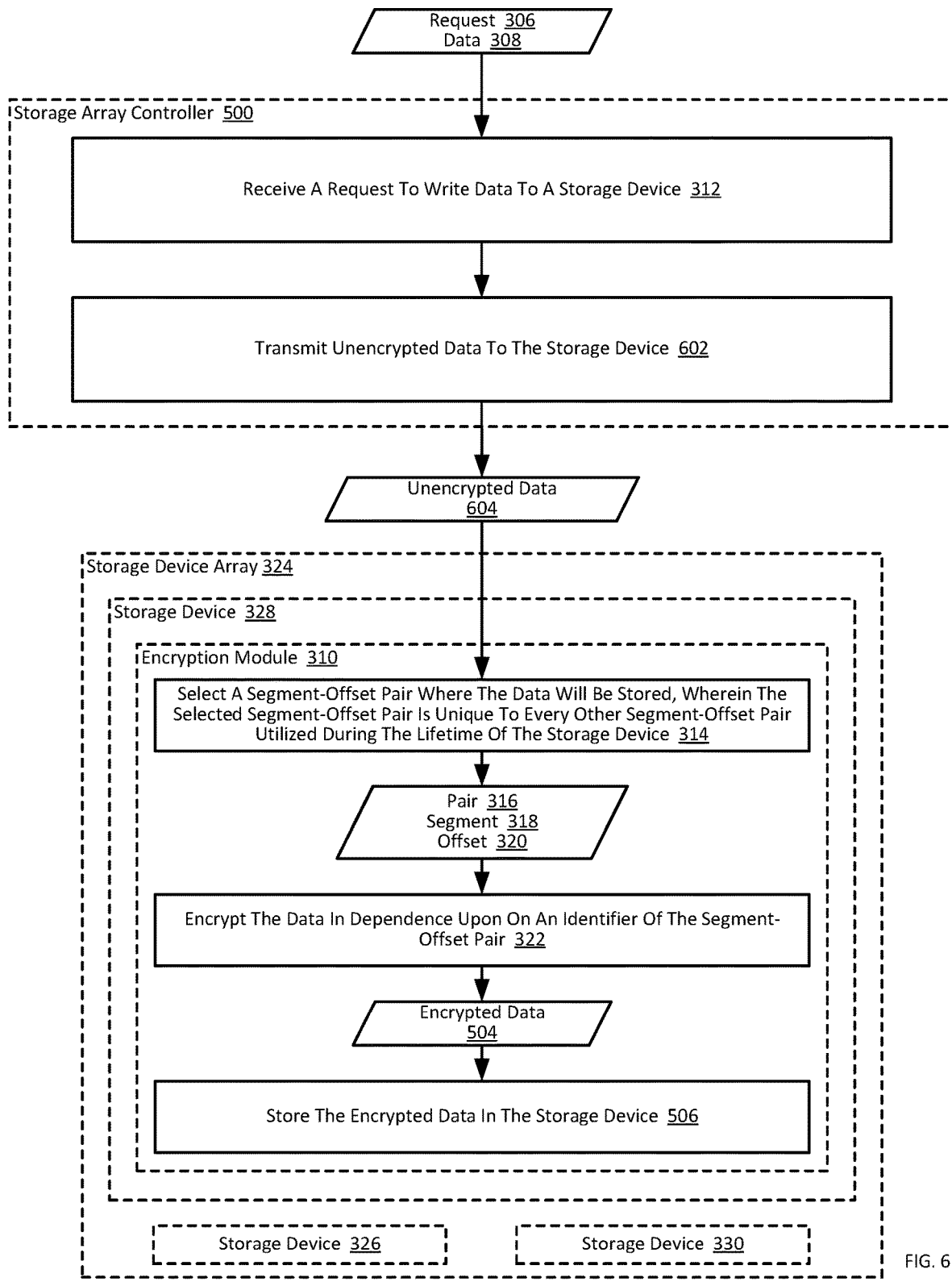
FIG. 6 sets forth a flow chart illustrating an additional example method for utilizing a non-repeating identifier to encrypt data according to embodiments of the present invention.

For further explanation, FIG. 6 sets forth a flow chart illustrating an additional example method for utilizing a non-repeating identifier to encrypt data according to embodiments of the present invention. The example method depicted in FIG. 6 is similar to the example method depicted in FIG. 3, as the example method depicted in FIG. 6 also includes receiving (312) a request (306) to write data (308) to a storage device (326, 328, 330), selecting (314) a segment-offset pair (316) where the data (308) will be stored, and encrypting (322) the data (308) in dependence upon an identifier of the segment-offset pair (316).

In the example method depicted in FIG. 6, the encryption module (310) resides on the storage devices themselves. Although FIG. 6 illustrates an encryption module (310) residing on only one storage device (328), readers will appreciate the remaining storage devices (326, 330) may also include encryption modules (310). In the example method depicted in FIG. 6, selecting (314) a segment-offset pair (316) where the data (308) will be stored and encrypting (322) the data (308) in dependence upon an identifier of the segment-offset pair (316) is carried out by an encryption module (310) that is executing on the storage device (328).

The example method depicted in FIG. 6 also includes transmitting (602) unencrypted data (604) to the storage device (328). The unencrypted data (604) may be transmitted (602) from the storage array controller (500) to a particular storage device (328) via a data communications link between the storage array controller (500) and the particular storage device (328). Such a data communications link may be embodied, for example, as a plurality of PCIe links that couple the storage array controller (500) and the particular storage device (328) to different sides of a midplane, as described above with reference to FIG. 1. The unencrypted data (604) may be transmitted (602) from the storage array controller (500) to a particular storage device (328) via one or more messages that may include other information useful in writing the unencrypted data (604) to the particular storage device (328).

In the example method depicted in FIG. 6, upon receiving the unencrypted data (604), the storage device (328) may be configured to encrypt the unencrypted data (604) and store (506) the encrypted data (504). In such an example, any additional information utilized to encrypt the unencrypted data (604) may be sent to the storage device (328) from a storage array controller or from any other source. For example, the identifier of the segment-offset pair (316), an encryption key, or any other information utilized to encrypt the unencrypted data (604) may be sent to the storage device (328) from a storage array controller or from any other source.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   based on a write request, encrypting data of the write request using an identifier, of a logical segment, that is one of one or more unique non-repeating identifiers that map to a same physical storage space during a storage device lifetime; and
   storing the data in the segment, wherein the identifier includes a segment-offset pair where the data will be stored.

2. The method of claim 1 further comprising selecting the segment-offset pair where the data will be stored, including:
   determining whether an active segment has enough free space to store the data;
   responsive to determining that the active segment does have enough free space to store the data, storing the data in the active segment; and
   responsive to determining that the active segment does not have enough free space to store the data:
   creating a new segment; and
   storing the data in the new segment.

3. The method of claim 2 wherein creating the new segment further comprises selecting a new segment identifier using a monotonically increasing number for the new segment identifier.

4. The method of claim 2 wherein creating the new segment further comprises selecting a new segment identifier using a Bloom filter to verify that the new segment identifier is unique relative to all other segment identifiers previously utilized by the storage device.

5. The method of claim 1 wherein the identifier is determined based on a location at which the data will be stored.

6. The method of claim 1 further comprising:
transmitting unencrypted data to the storage device; and
storing encrypted data in the storage device.

7. An apparatus comprising a computer processor, a computer memory operatively coupled to the computer processor, the computer memory having disposed within it computer program instructions that, when executed by the computer processor, cause the apparatus to carry out the steps of:
based on a write request, encrypting data of the write request using an identifier, of a logical segment, that is one of one or more unique non-repeating identifiers that map to a same physical storage space during a storage device lifetime; and
storing the data in the segment, wherein the identifier includes a segment-offset pair where the data will be stored.

8. The apparatus of claim 7 further comprising computer program instructions that, when executed by the computer processor, cause the apparatus to carry out the step of selecting the segment-offset pair where the data will be stored, including:
determining whether an active segment has enough free space to store the data;
responsive to determining that the active segment does have enough free space to store the data, storing the data in the active segment; and responsive to determining that the active segment does not have enough free space to store the data:
creating a new segment; and
storing the data in the new segment.

9. The apparatus of claim 8 wherein creating the new segment further comprises selecting a new segment identifier using a monotonically increasing number for the new segment identifier.

10. The apparatus of claim 8 wherein creating the new segment further comprises selecting a new segment identifier using a Bloom filter to verify that the new segment identifier is unique relative to all other segment identifiers previously utilized by the storage device.

11. The apparatus of claim 7 wherein the identifier is determined based on a location at which the data will be stored.

12. The apparatus of claim 7 further comprising computer program instructions that, when executed by the computer processor, cause the apparatus to carry out the steps of:
transmitting unencrypted data to the storage device; and
storing encrypted data in the storage device.

13. A computer program product disposed upon a computer readable medium, wherein the computer readable medium is not a signal, the computer program product comprising computer program instructions that, when executed, cause a computer to carry out the steps of:
based on a write request, encrypting data of the write request using an identifier, of a logical segment, that is one of one or more unique non-repeating identifiers that map to a same physical storage space during a storage device lifetime; and
storing the data in the segment, wherein the identifier includes a segment-offset pair where the data will be stored.

14. The computer program product of claim 13 further comprising computer program instructions that, when executed, cause the computer to carry out the step of selecting the segment-offset pair where the data will be stored further comprises, including:
determining whether an active segment has enough free space to store the data;
responsive to determining that the active segment does have enough free space to store the data, storing the data in the active segment; and
responsive to determining that the active segment does not have enough free space to store the data:
creating a new segment; and
storing the data in the new segment.

15. The computer program product of claim 14 wherein creating the new segment further comprises selecting a new segment identifier using a monotonically increasing number for the new segment identifier.

16. The computer program product of claim 14 wherein creating the new segment further comprises selecting a new segment identifier using a Bloom filter to verify that the new segment identifier is unique relative to all other segment identifiers previously utilized by the storage device.

17. The computer program product of claim 13 wherein the identifier is determined based on a location at which the data will be stored.

* * * * *